United States Patent Office 3,530,113
Patented Sept. 22, 1970

3,530,113
6-DESOXY-D-FURANOSIDE ETHERS
Alberto Rossi, Oberwil, Basel-Land, Switzerland, assignor to Ciba Corporation, Summit, N.J., a corporation of Delaware
No Drawing. Filed Sept. 4, 1968, Ser. No. 757,499
Claims priority, application Switzerland, Sept. 11, 1967, 12,703/67; July 2, 1968, 9,835/68
Int. Cl. C07c 47/18
U.S. Cl. 260—210
10 Claims

ABSTRACT OF THE DISCLOSURE 6-desoxy-D-xylohexafuranosides of the formula:

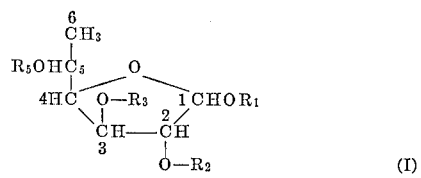

in which $R_1$ represents an aliphatic, cycloaliphatic, cycloaliphatic-aliphatic or araliphatic residue, and $R_2$ represents hydrogen or the acyl residue of an organic carboxylic acid, and in which one of the groups $R_3$ and $R_5$ represents a hydrogen atom or an aliphatic, cycloaliphatic, cycloaliphatic-aliphatic or araliphatic residue, and the other an aliphatic, cycloaliphatic, cycloaliphatic-aliphatic or araliphatic residue, and the salts of compounds having salt-forming groups have anti-inflammatory properties.

SUMMARY OF THE DISCLOSURE

The 6-desoxy-D-xylohexafuranosides of the Formula I, in which $R_1$, $R_2$, $R_3$ and $R_5$ have the above given meaning are useful as anti-inflammatory, particularly as anti-exsudative or antiedematous agents.

DESCRIPTION OF THE PREFERRED EMBODIMENTS

The above compounds have the configuration of 6-desoxy-D-glucofuranose and of 6-desoxy-L-idofuranose, i.e. both compound types isomeric in 5-position are concerned. The etherified hydroxyl group in 1-position may have α- or β-configuration; the compounds of this invention may be in form of pure anomers or of mixtures of anomers.

Aliphatic residues $R_1$, $R_3$ and/or $R_5$ are primarily optionally substituted aliphatic, especially lower aliphatic hydrocarbon, such as lower alkyl or lower alkenyl residues. Substituents of aliphatic, such as lower aliphatic, hydrocarbon residues, especially lower alkyl groups are, for example, free, etherified or esterfied hydroxyl groups, whereby one, two or more such substituents may be present.

Cycloaliphatic residues are, for example, optionally substituted cycloaliphatic hydrocarbon residues, such as optionally substituted cycloalkyl or cycloalkenyl residues; cycloaliphatic-aliphatic residues are optionally substituted cycloaliphatic-lower aliphatic hydrocarbon residues, such as optionally substituted cycloalkyl-lower alkyl or cycloalkenyl-lower alkyl residues. The above-mentioned cycloaliphatic groups contain, for example, up to 8, preferably 3 to 8 ring carbon atoms in the saturated and 5 to 8 ring carbon atoms in the unsaturated residues; these carbon atoms may, if desired, by mono-, di- or poly-substituted, for example, by lower aliphatic hydrocarbon residues, such as lower alkyl groups.

Araliphatic residues are optionally substituted aromatic hydrocarbon residues, especially optionally substituted phenyl group, containing lower aliphatic hydrocarbon residues, such as phenyl-lower alkyl or phenyl-lower alkenyl groups, which may be substituted in the aromatic residue. Aromatic hydrocarbon residues may be substituted, for example, by lower aliphatic groups, etherified or esterified hydroxyl groups, or pseudohalogens, such as trifluoromethyl groups.

The acyl residue $R_2$ of an organic carboxylic acid is preferably the residue of an aliphatic, aromatic, or araliphatic carboxylic acid, especially of a lower alkanecarboxylic acid, or of a lower alkane- or of a lower alkenedicarboxylic acid.

Residues, radicals or compounds modified above and hereinafter by "lower" contain, unless otherwise indicated, especially up to 7, preferably up to 4 carbon atoms.

Lower alkyl residues are, for example, methyl, ethyl, propyl, isopropyl, butyl, isobutyl, secondary or tertiary butyl, pentyl, isopentyl, neopentyl, hexyl or isohexyl, heptyl or isoheptyl residues; lower alkenyl residues are, for example, allyl, methallyl or 2-butenyl residues.

Cycloalkyl groups contain, for example, 3 to 8, preferably 5 to 6 ring carbon atoms, whereas cycloalkenyl groups contain, for example, 5 to 8, preferably 5 to 6 ring carbon atoms; such cycloalkyl residues are, for example, cyclopropyl, cyclobutyl, cyclopentyl, cyclohexyl or cycloheptyl residues. Cycloalkenyl residues are in the first place 2- or 3-cyclopentyl, 2- or 3-cyclohexenyl or 2-, 3- or 4-cycloheptenyl residues. In cycloalkyl-lower alkyl and cycloalkenyl-lower alkyl groups the cycloalkyl and cycloalkenyl residues have the meanings mentioned above; such groups are, for example, cyclopropylmethyl-cyclopentylmethyl, 2-cyclopentylethyl or cyclohexylmethyl, as well as 2-cyclopentenylmethyl or 3-cyclohexenylmethyl residues.

Phenyl-lower alkyl and phenyl-lower alkenyl groups the aromatic ring of which may be substituted, are in the first place optionally substituted benzyl residues, 1- or 2-phenyl-ethyl or cinnamyl residues.

A lower alkanecarboxylic acid is, for example, acetic, propionic or pivalic acid, and a lower alkanedicarboxylic acid is, for example, one that contains 2–7, preferably 3–6 carbon atoms, for example, malonic, 2-methylsuccinic, glutaric, 3-methylglutaric, 3-ethylglutaric, adipic or pimelic acid, in the first place succinic acid, and a lower alkenedicarboxylic acid with, for example, 4 to 7 carbon atoms is, for example, fumaric or maleic acid.

Etherified hydroxyl groups occurring as substituents of aliphatic hydrocarbon residues are, for example, lower alkoxy, such as methoxy, ethoxy, propyloxy, isopropyloxy, butyloxy, isobutyloxy, secondary butyloxy, n-pentyloxy or n-hexyloxy groups, lower alkenyloxy, such as vinyloxy or allyloxy groups, or lower alkylenedioxy, such as methylenedioxy groups; esterified hydroxyl groups are, for example, lower alkanoyloxy, such as acetyloxy or propionyloxy groups, or halogen, such as fluorine, chlorine or bromine atoms. Cycloaliphatic and aromatic hydrocarbon residues, which may be substituted by lower aliphatic residues, preferably contain lower alkyl groups such as those mentioned above, as substituents.

Lower aliphatic hydrocarbon residues substituted by free or etherified hydroxyl groups are in the first place hydroxy- or lower alkoxy-lower alkyl residues, in which a free or etherified hydroxyl group is preferably separated by at least two carbon atoms from an oxygen atom substituted by such residues, for instance, 2-hydroxyethyl, 2- or 3-hydroxypropyl, 2,3-dihydroxypropyl, 2-methoxyethyl, 2-ethoxyethyl, 2-methoxypropyl, 3-methoxypropyl or 3-ethoxypropyl residues. Lower aliphatic hydrocarbon residues containing esterified hydroxyl groups are, for example, lower alkanoyloxy or halogeno-lower alkyl residues, in which an esterified hydroxyl group is preferably separated from an oxygen atom substituted by such residues by at least two carbon atoms, for example, 2-acetyloxyethyl or 2-chloroethyl groups.

Substituents of aromatic hydrocarbon residues in araliphatic groups are more especially lower alkyl, lower alkoxy, lower alkenyloxy, lower alkylenedioxy, trifluoromethyl groups or halogen atoms, whereby one, two or more identical or different groups may be present as substituents. In monosubstituted aromatic residues a substituent is preferably located in the para-position.

The new compounds possess valuable pharmacological properties. Inter alia, they display more especially anti-inflammatory activities, as can be shown in animal experiments, for example, in the turpentine pleuritis test performed in analogy to the test described by Spector, J. Path. Bact., vol. 72, p. 367 [1956], using for example rats, upon intraperitoneal administration of about 0.03 to about 0.3 g. per kg. Furthermore, as can be shown for instance in animal tests, for example, on guinea pigs, they possess an antiallergic effect. In vitro tests reveal that the compounds of this invention antagonize the effects of histamine and bradykinin and, in contrast to similar compounds, they also inhibit the effect of serotonin and arachidonic acid peroxide. The new compounds are, therefore, useful as anti-inflammatory, especially as antiexudative or anti-oedemic substances. The new compounds are also valuable intermediates for the manufacture of other useful substances, especially of compounds having pharmacological activities.

Especially valuable pharmacological properties are shown by 6-desoxy-D-glucofuranosides of the formula:

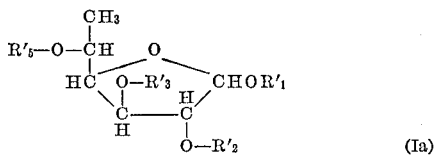

(Ia)

and 6-desoxy-L-idofuranosides of the formula:

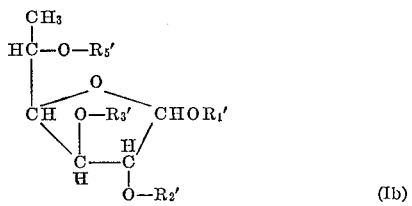

(Ib)

in which formulae $R_1'$ represents a lower alkenyl, such as allyl or a hydroxy-lower alkyl, especially a lower alkyl residue, $R_2'$ represents a hydrogen atom or the acyl residue of a lower alkanedicarboxylic acid, especially the succinyl residue, one of the groups $R_3'$ and $R_5'$ is a hydrogen atom, a lower alkyl, a lower alkenyl, such as allyl residue, or in the first place a benzyl radical which may be substituted by lower alkyl groups or halogen atoms, especially an $R_a$-benzyl radical, in which $R_a$ is a hydrogen atom, a lower alkyl, especially methyl group, or a halogen atom, preferably one of atomic weight of 19 to 80, especially a chlorine atom, a substituent $R_a$ being preferably in para-position, and the other is a lower alkyl, or a lower alkenyl, such as allyl residue, or in the first place a benzyl residue, which may be substituted by lower alkyl groups or by halogen atoms, being especially an $R_a$-benzyl residue, and the salts, especially the non-toxic ammonium, alkali or alkaline earth metal salts of compounds, in which $R_2'$ represents the acyl residue of a lower alkanedicarboxylic acid, especially a succinyl residue.

An especially pronounced pharmacological activity of the kind mentioned above is found in the lower alkyl-3-O-$R_3''$-5-O-$R_5''$-6-desoxy-D-glucofuranosides and the lower alkyl-3-O-$R_3''$-5-O-$R_5''$-6-desoxy-L-idofuranosides, in which $R_3''$ and $R_5''$ each represents a lower alkyl group or in the first place a benzyl residue optionally substituted, preferably in 4-position by halogen, especially chlorine atoms, or by lower alkyl, especially methyl groups, $R_5''$ being especially one of the benzyl residues, as well as their 2-O-succinyl derivatives and their salts, especially those of the kind defined above. Especially efficacious in the indicated manner is ethyl-3,5-bis-O-benzyl - 6-desoxy-D-glucofuranoside and ethyl-3,5-bis-O-(4-chlorobenzyl)-6-desoxy-D-glucofuranoside, as well as the ethyl-3,5-bis-O-benzyl-6-desoxy-L-idofuranoside or ethyl-3 - O-benzyl-5-O-(4-chlorobenzyl)-6-desoxy-L-idofuranoside in form of anomer mixtures or of pure anomers, which show in the rat on intraperitoneal administration of a dose from 0.03 to 0.3 g./kg. a distinct anti-inflammatory effect, as well as their 2-O-succinyl derivatives and salts salts thereof, especially those of the kind specified above.

The compounds of this invention are manufactured in known manner, for example by reacting a 6-desoxy-D-xylohexafuranose of the formula:

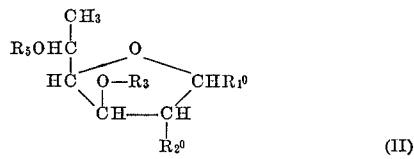

(II)

in which $R_1^0$ is a free hydroxyl group and $R_2^0$ represents a free hydroxyl group or an acyloxy residue, in which acyl is the residue of an organic carboxylic acid, or $R_1^0$ and $R_2^0$ together represent the grouping of the formula —O—X—O—, in which X stands for an optionally substituted methylene group, with a compound of the formula $R_1$—OH in the presence of an acid and, if desired, saturating in a resulting compound an unsaturated aliphatic hydrocarbon residue, and/or, if desired, converting in a resulting compound an acyloxy residue in 2-position into a free hydroxyl group or into another acyloxy group and/or converting a free hydroxyl group in 2-position into a hydroxyl group esterified with an organic carboxylic acid.

The acyl residue of an organic carboxylic acid is, for example, the residue of one of the acids mentioned above.

A group X in the starting material of the Formula II is a methylene group which may be unsubstituted, monosubstituted or preferably disubstituted. Preferred substituents are optionally substituted mono- or bivalent aliphatic hydrocarbon residues, preferably lower alkyl, for example ethyl, propyl, isopropyl or n-butyl, or especially methyl groups, or lower alkylene residues containing 4 to 6 chain carbon atoms, such as 1,4-butylene or 1,5-pentylene residues. If desired, these hydrocarbon residues may be substituted, for example, by lower alkyl, hydroxyl or lower alkoxy groups or by halogen atoms, or by aromatic groups, such as phenyl residues, which themselves may be substituted, for example, by lower alkyl, hydroxyl or lower alkoxy groups or by halogen atoms. Further substituents of the methylene group X may be, for example, aromatic residues, such as phenyl groups optionally substituted, for example, as indicated above, or free or functionally modified, such as esterified, carboxyl groups, for example, carbo-lower alkoxy, such as carbomethoxy or carbethoxy groups.

An acid to be used is a Lewis acid compound, especially an inorganic acid, such as a mineral acid, especially hydrochloric acid, or hydrobromic or sulphuric acid, or an organic, such as an organic sulphonic, e.g. p-toluene-sulphonic acid, or a mixture of acids, for example, a mixture of hydrochloric acid and glacial acetic acid.

The reaction of a starting material of the Formula II, in which $R_1^0$ is a free and $R_2^0$ a free or acylated hydroxyl group, with an alcohol of the formula $R_1$—OH is preferably performed at a mineral acid concentration from about 0.05 N to about 1 N, in the first place from about 0.1 N about 0.5 N.

The above reaction is preferably carried out in the presence of a diluent; inter alia, the alcoholic reagent of the formula $R_1$—OH may at the same time be used as a solvent. It is also possible to use a mixture of solvents or diluents.

The compounds of the present invention are also obtained, when in a 6-desoxy-D-xylohexafuranose of the Formula II, in which $R_1^0$ is a reactive esterified hydroxyl group and $R_2^0$ represents an acyloxy radical, acyl being the acyl residue of an organic carboxylic acid, the residue $R_1^0$ is replaced by the residue $OR_1$, and, if desired, the optional steps are carried out.

A reactive esterified hydroxy group $R_1^0$ is in the first place a hydroxyl group esterified by a hydrohalic acid; $R_1^0$ is, therefore, especially a halogen, particularly a bromine atom.

A reactive esterified hydroxyl group $R_1^0$ is preferably exchanged by treating the starting material with a compound of the formula $R_1$—OH in the presence of an acid acceptor, for example, a silver, lead or mercury salt or a corresponding oxide thereof, or a tertiary base, in the first place of a metal derivative of a compound of the formula $R_1$—OH, such as the corresponding alkali metal, for example, sodium or potassium compound, or alkaline earth metal, for example, magnesium, or silver compound.

The above reaction is preferably performed in the presence of a solvent; if desired, the alcoholic reagent may be used at the same time as diluent.

The compounds of this invention are also obtained, when in a 5,6-bis-desoxy-D-xylohexafuranoside of the formula

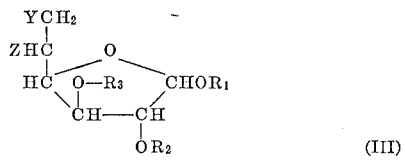

(III)

in which Y represents a group eliminable by reduction and Z represents the group $R_5$—O—, or in which Y and Z together represent an oxido group, the group Y or the epoxide grouping formed by Y and Z is reductively eliminated or split, and, if desired, the additional steps are carried out.

A reductively eliminable group Y is in the first place a suitably esterified, especially a reactive esterified, hydroxyl group, such as an organic sulphonyloxy group, for example, the p-toluenesulphonyloxy group, or a halogen atom, especially an iodine atom. Such groups can be eliminated, reductively, an organic sulphonyloxy group, for instance, by treatment with a suitable hydride reducing agent, such as lithium aluminium hydride, and a halogen atom, especially the iodine atom, for example, by treatment with catalytically activated hydrogen, such as hydrogen in the presence of a palladium catalyst.

In a 5,6-bis-desoxy-D-xylohexafuranoside of the Formula III, in which Y and Z together represent an oxido group, the epoxide ring may be split reductively, for example, by treatment with catalytically activated hydrogen, such as hydrogen in the presence of a palladium catalyst, or by treatment with a hydride reducing agent, such as lithium aluminium hydride, to form a 6-desoxy-D-xylohexafuranoside containing in 5-position a free hydroxyl group.

In a compound of this invention an unsaturated lower aliphatic hydrocarbon residue, such as a lower alkenyl, for example allyl radical, may be saturated, for instance, by treatment with catalytically activated hydrogen, for example, hydrogen in the presence of a palladium catalyst.

In compounds of this invention, in which $R_2$ represents an acyl radical, this radical can be replaced by hydrogen, for example, by treatment with an alkaline reagent, such as an alkaline earth or alkali metal hydroxide or carbonate, or with silver oxide, in an aqueous or alcoholic medium.

In compounds, in which $R_2$ represents a hydrogen atom, the free hydroxy group can be esterified in known manner by treatment with an acylating agent capable of introducing the acyl residue of an organic carboxylic acid. This reaction is preferably performed with compounds in which each of the groups $R_3$ and $R_5$ represents an organic residue. Suitable acylating agents are acid derivatives (in the case of dicarboxylic acids, for example, their monoacid derivatives), especially anhydrides (including the inner anhydrides, such as corresponding ketenes), and halides, especially chlorides. The reaction is preferably conducted with an anhydride, for example, succinic anhydride, in the presence of an acid or basic catalyst, for example, pyridine. Reaction with a carboxylic acid halide, for example, a chloride, such as succinic acid monochloride, can be performed in the presence of an acid acceptor as condensing agent, such as a tertiary base or sodium acetate. A free hydroxyl group may also be esterified with the aid of a carboxylic acid in the presence of a suitable condensing agent, such as dicyclohexyl carbodiimide, or of a reactive ester of a carboxylic acid, such as an ester with N-hydroxyamino or N-hydroxyimino compounds, for example, N-hydroxysuccinimide.

Compounds containing salt-forming groups, for example, free carboxyl groups, in the acyl radical $R_2$ may be obtained in free form or in form of their salts, depending on the reaction conditions employed; these forms may be converted one into each other in known manner. Salts of compounds containing a free carboxyl group are, for example, metal salts, especially alkali metal, for example, sodium or potassium salts, or alkaline earth metal, for example, calcium or magnesium salts, or ammonium salts, for example, those with ammonia or with organic bases, such as tri-lower alkyl amines, for example, trimethylamine or triethylamine, especially the non-toxic salts of the above-mentioned kind. Such salts, especially the alkali metal salts, of the new compounds are distinguished by their good solubility in water. Salts may also be used for purifying the free compounds. They are obtained, for example, by treating the free compounds with metal hydroxides or carbonates or with ammonia or amines or with suitable ion exchange resins.

In view of the close relationship between the new compounds in free form and in form of their salts, what has been said above and hereinafter with reference to the free compounds of the salts concerns also the corresponding salts and free compounds, respectively, wherever such is possible and feasible.

The new compounds may be in the form of pure α- or β-anomers or of anomer mixtures. The latter can be resolved into the pure anomers in known manner on the basis of the physico-chemical differences of the constituents, for example, by way of chromatographic separation, such as thin-layer chromatography, or by any other suitable separation method. Preferably, the more active of the two anomers is isolated.

The processes described above are carried out in known manner, in the absence or preferably presence of diluents or solvents, if necessary, with cooling or heating, under increased pressure and/or in the atmosphere of an inert gas, such as nitrogen.

The invention includes also any modification of the process, in which an intermediate obtained at any stage of the process is used as starting material and the remaining process steps are carried out, or the process is interrupted at any stage, or in which a starting material is formed under the reaction conditions or used in form of a reactive derivative thereof. It is advantageous to use starting materials which furnish the compounds indicated above as being specially valuable.

The starting materials are known or, insofar as they are new, they are accessible by known methods. Generally, 6-desoxy-D-xylohexafuranose compounds are obtained, when in a D-xylohexafuranose, containing in 1- and 2-positions hydroxyl groups protected, for example, by an isopropylidene group, the hydroxyl group in 6-position is selectively esterified, for example, by treatment with an organic sulphonyl halide, such as p-toluenesulphonyl chloride, in the presence of a base, preferably an organic base, such as pyridine, or the two hydroxyl groups in 3- and 5-positions are temporarily protected, for example, by a benzylidene group (which is introduced, for example, by treatment with benzaldehyde in the presence of zinc-II-chloride) and the 6-hydroxyl group is then esterified as described above. If desired, in a compound thus obtained, in which the hydroxyl groups in 3- and 5-positions are preferably protected as shown (a benzylidene group may also be introduced after selective esterification of the 6-hydroxyl group), an organic sulphonyloxy group may be converted into another eliminable group, for example, by treatment with a suitable reagent, such as potassium iodide, and/or reductively eliminated as previously described; a benzylidene group protecting the hydroxyl groups in 3- and 5-positions may be eliminated, for example, reductively, such as by treatment with hydrogen in the presence of a palladium catalyst, in certain circumstances simultaneously with the reactive esterified hydroxyl group in 6-position.

In a 6-desoxy-D-xylohexafuranose thus obtained, in which the hydroxyl groups in 1- and 2-positions are screened by a protective group, for example, the group X, which represents especially an isopropylidene or a benzylidene group, the hydroxyl groups in 3- and 5-positions may be etherified by treatment with a reactive ester of a suitable alcohol, for example, a suitable halide, for instance, the chloride or bromide, or with a suitable organic sulphonyloxy, such as p-toluene-sulphonyloxy compound, in the presence of a basic agent, such as an alkali metal hydroxide or carbonate, for example, sodium or potassium hydroxide or carbonate, or of silver oxide. The etherification is advantageously performed in the presence of a solvent, such as dioxan or dimethylsulphoxide.

The two hydroxyl groups may be selectively etherified, for example, by etherifying in a 1,2,5,6-bis-O-isopropylidene-D-xylohexafuranose the 3-hydroxyl group by treatment with a reactive ester of a suitable alcohol, then selectively liberating the hydroxyl groups in 5- and 6-positions, i.e. without liberating the hydroxyl groups in 1- and 2-positions, for example, by treatment with an acid, such as aqueous acetic acid (for example at 35° C.), or aqueous ethanolic hydrochloric acid (for example, at low temperatures) and replacing the hydroxyl group in 6-position by hydrogen, for example, by esterification with a strong organic sulphonic acid, for example, by treatment with p-toluenesulphonyl chloride in the presence of a base, such as pyridine, and reductive elimination of the organic sulphonyloxy group, for example, by treatment with a complex metal hydride, such as lithium aluminium hydride, to furnish a 6-desoxy-D-xylohexafuranose containing screened hydroxyl groups in 1- and 2-positions, an etherified hydroxyl group in 3-position and a free hydroxyl group in 5-position. In a compound thus obtained, the free hydroxyl group in 5-position can be etherified as described above, for example, by treatment with a reactive ester of a suitable alcohol.

When an etherified hydroxyl group, in 3-position, is a 2-lower alkenyloxy, especially the allyloxy group, this group can be eliminated, for example, by rearrangement of the double bond by means of a suitable base, such as an alkali metal butyloxide, for example, potassium tertiary butyloxide, preferably in a suitable solvent, for example, dimethylsulphoxide, and oxidative-hydrolytic removal of the resulting 1-lower alkenyl, such as 1-propenyl group, for example, by treatment with potassium permanganate, preferably in a basic medium such as ethanolic alkali metal, such as sodium, hydroxide. This gives rise to a 6 - desoxy - D - xylohexafuranose which contains screened hydroxyl groups in 1- and 2-positions, a free hydroxyl group in 3-position and an etherified hydroxyl group in 5-position.

In a 6-desoxy-D-xylohexafuranose containing etherified hydroxyl groups in 3- and 5-positions and screened hydroxyl groups in 1- and 2-positions, the protective group can be removed as described, for example, by treatment with an aqueous acid, such as aqueous sulphuric, hydrochloric or acetic acid or with a mixture thereof, and the two hydroxyl groups in 1- and 2-positions can be esterified, for example, by treatment with a suitable derivative of an organic carboxylic acid, such as acetic acid, for example, an anhydride thereof, such as acetic anhydride, to form a 1,2-bis-O-acyl compound, especially a 1,2-bis-O-acetyl compound. On reaction, for example, with bromine in glacial acetic acid, there results a 2-O-acyl, e.g. 2-O-acetyl, compound which is suitable for use as starting material, containing in 1-position a reactive esterified hydroxy group, for example, a bromine atom.

A starting material of the Formula III is obtained, for example, when in a D-xylohexafuranose containing screened hydroxyl groups in 1- and 2-positions, the hydroxyl group in 6-position is temporarily protected, for example, by a trityl group (for example, by treatment with trityl chloride in the presence of pyridine), the hydroxyl groups in 3- and 5-positions are etherified by the above process, that is to say by treatment with a reactive alcohol in the presence of a basic agent, and a protective group in 6-position is eliminated, the trityl group, for example, by treatment with an acid. If desired, it is possible to liberate the hydroxyl groups in 1- and 2-positions, for example, by treatment with an alcohol in the presence of a Lewis acid, with simultaneous glycosidation of the hydroxyl group in 1-position. In a resulting compound containing free or screened hydroxyl groups in 1- and 2-positions, the free hydroxyl group in 6-position may be esterified, for example, with an organic sulphonic acid, e.g. by treatment with a halide thereof, in the presence of a base, for example, pyridine, and, if desired, converted into a halogen atom, preferably an iodine atom, for example, by treatment with potassium iodine; if necessary, the hydroxyl groups in 1- and 2-positions can then be liberated as described.

A starting material of the Formula III, in which Y and Z together represent an oxido group, can be manufactured, for example, by exclusively liberating in a D-xylohexafuranose, which contains in 3-position an etherified hydroxyl group and screened hydroxyl groups in 1- and 2-, as well as 5- and 6-positions, the latter two, and, if desired, forming the D-xylohexafuranoside by treatment with an alcohol in the presence of a Lewis acid. In the resulting D-xylohexafuranoses or D-xylohexafuranosides, containing in 3-position an etherified hydroxyl group, the hydroxyl group in 6-position is esterified, for example, by treatment with an organic sulphonyl halide, such as p-toluenesulphonyl chloride, in the presence of a base, such as pyridine, and by treatment, for example, with an alkali metal, such as sodium or potassium, lower alkoxide, such as methoxide or ethoxide, there are formed the 5,6-oxido-D - xylohexafuranoses or 5,6 - oxido - D-xylohexafuranosides having an etherified hydroxyl group in 3-position. From a 5,6-oxido-D-xylohexafuranose, the corresponding D-xylohexafuranoside can be formed in known manner.

Furthermore, starting from a 3-O-R$_3$-D-glucofuranose containing protected hydroxyl groups in 1- and 2-positions, in which R$_3$ is one of the above-mentioned organic residues, it is possible to manufacture by oxidaton, for example, with lead tetraacetate, 3-O-R$_3$-D-xylopentadialdo-1,4-furanoses containing protected hydroxyl groups in 1- and 2-positions, which can be converted by reaction with a methyl-Grignard reagent into 3-O-R$_3$-6-desoxy-L-idofuranoses containing protected hydroxyl groups in 1- and 2-positions, in which, if desired, the free hydroxyl group in 5-position can be etherified in known manner.

At any suitable stage of the process described above for the manufacture of the starting material, a hydroxyl group etherified by a suitable 2-alkenyl residue can be liberated as previously described, that is to say by rearrangement of the double bond and oxidative-hydrolytic removal of the 1-alkenyl group.

The new compounds or their salts can be used as medicaments, for example, in form of pharmaceutical preparations containing them in conjunction or admixture with an organic or inorganic, solid or liquid pharmaceutical excipient suitable for enteral, parenteral or local administraton. Suitable excipients are substances which are inert towards the new compounds, such as water, gelatin, sugars, for example, lactose, glucose or fructose, starches such as corn, wheat or rice starch, stearic acid or salts thereof, such as calcium or magnesium stearate, talcum, vegetable oils, benzyl alcohols, gums, polyalkylenegycols, propyeneglycol or other known carrier substances. The pharmaceutical preparations may be in solid form, for example, as tablets or dragees, or in liquid form, e.g. as solutions, suspensions or emulsions. They may be sterilized and/or may contain auxiliary substances, such as preserving, stabilizing, wetting or emulsifying agents, salts for regulating the osmotic pressure or buffers. They may also contain further therapeutically valuable substances. The preparations are formulated by the usual methods.

The following examples illustrate the invention; temperatures are given in degrees centigrade.

EXAMPLE 1

A solution of 19 g. of 1,2-O-isopropylidene-3,5-di-O-benzyl-6-desoxy-α-D-glucofuranose in 534 ml. of absolute ethanol is mixed at 10° with 66 ml. of a 9 N ethanolic hydrogen chloride solution. The reaction mixture is kept for 16 hours at room temperature, then cooled to 0–5° and neutralized with an aqueous 10 N sodium hydroxide solution. The bulk of the ethanol is distilled off at 40° under reduced pressure, and the residue is extracted with chloroform. The chloroform solution is washed with an aqueous sodium bisulphite solution and with water, dried over sodium sulphate and evaporated under reduced pressure. The residue is distilled to yield the ethyl-3,5-di-O-benzyl-6-desoxy-D-glucofuranoside of the formula.

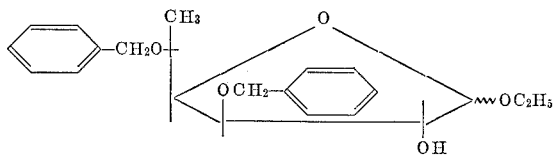

as a slightly yellowish oil boiling at 200°/0.2 mm. Hg; $[\alpha]_D^{20}=-48°\pm1°$ (c.=1 in chloroform).

The starting material used may be prepared as follows:
A mixture of 20.4 g. of 1,2-O-isopropylidene-6-desoxy-α-D-glucofuranose and 75.6 g. of benzyl chloride in 90 ml. of absolute dioxan is heated to 80–90°. Then, 36.6 g. of powdered potassium hydroxide are stirred in portionwise, and the mixture is allowed to react for 8 hours at 80–90°. Another 12 g. of powdered potassium hydroxide and 24 g. of benzyl chloride are added, and the mixture is allowed to react for another 4 hours at 80–90°. The excess of benzyl chloride is then distilled off with steam. On cooling, the mixture is extracted with chloroform and the organic extract is dried over sodium sulphate and evaporated under reduced pressure. Treatment of the residue with a mixture of petroleum ether and ether furnishes the crystalline 1,2-O-isopropylidene-3,5-di-O-benzyl - 6 - desoxy-α-D-glucofuranose, M.P. 53°; $[\alpha]_D^{20}=-56°\pm1°$ (c.=1 chloroform).

EXAMPLE 2

A solution of 28 g. of 1,2-O-isopropylidene-3,5-di-O-(4-chlorobenzyl)-6-desoxy-α-D-glucofuranose in 623 ml. of absolute ethanol is mixed at 10° with 77 ml. of a 9 N ethanolic solution of hydrogen chloride. The reaction mixture is kept for 17 hours at room temperature, then cooled to 0–5° and neutralized with an aqueous 10 N sodium hydroxide solution. The bulk of ethanol is distilled off at 35° under reduced pressure and the residue is extracted with chloroform. The organic solution is washed with an aqueous sodium bisulphite solution and with water, dried over sodium sulphate and evaporated under reduced pressure. The residue is freed from residual solvent at 35° under a high vacuum and yields the ethyl - 3,5 - di-O-(4-chlorobenzyl)-6-desoxy-D-glucofuranoside of the formula

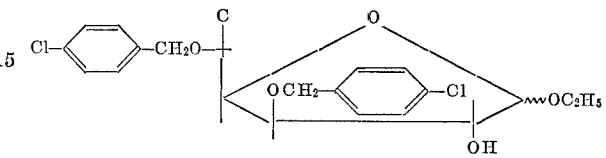

as a slightly yellowish oil at 220°/0.1 mm. Hg (micro distillation); $[\alpha]_D^{20}=-84°\pm1°$ (c.=1 in chloroform).

By elution with an 85:15-mixture of chloroform and ethyl acetate the pure anomers can be separated by thin-layer chromatography on silica gel (RF 254, Messrs. Merck Darmstadt). The α-anomer has an Rf value of 0.57; $[\alpha]_D^{20}=-13°\pm1°$ (c.=1 in chloroform); and the β-anomer an Rf value of 0.26; $[\alpha]_D^{20}=-102°\pm1°$ (c.=1 in chloroform).

The starting material used may be prepared as follows:
A mixture of 20.4 g. of 1,2-O-isopropylidene-6-desoxy-α-D-glucofuranose and 96.6 g. of 4-chlorobenzyl chloride in 90 ml. of absolute dioxan is heated to 80–90°, then 36.6 g. of powdered potassium hydroxide are stirred in portion-wise and the mixture is allowed to react for 8 hours at 80 to 90°. Another 20 g. of powdered potassium hydroxide and 10 ml. of 4-chlorobenzyl chloride are added and the mixture is allowed to react on for 4 hours at the same temperature. The excess of 4 chlorobenzyl chloride is then distilled off with steam. After cooling, the reaction mixture is extracted with chloroform, and the organic extract is dried over sodium sulphate and evaporated under reduced pressure. The residue is distilled under a high vacuum and yields the 1,2-O-isopropylidene - 3,5 - di - O-(4-chloro-benzyl)-6-desoxy-α-D-glucofuranose as a slightly yellowish oil at 200°/0.1 mm. Hg; $[\alpha]_D^{20}=-79°\pm1°$ (c.=1 in chloroform).

EXAMPLE 3

A solution of 10 g. of 1,2-O-isopropylidene-3,5-di-O-(4-chlorobenzyl)-6-desoxy-α-D-glucofuranose in 250 ml. of a 1 N solution of hydrogen chloride in n-butanol is kept for 17 hours at room temperature, then neutralized at 0–5° with an aqueous 10 N sodium hydroxide solution, the bulk of ethanol is distilled off under reduced pressure and the residue is extracted with chloroform. The chloroform extracts are washed with aqueous sodium bisulphite solution and with water, dried over sodium sulphate and evaporated under reduced pressure. The residue is freed from residual solvent at 40° under a high vacuum and yields the n-butyl-3,5-di-O-(4-chlorobenzyl) - 6 - desoxy-D-glucofuranoside of the formula:

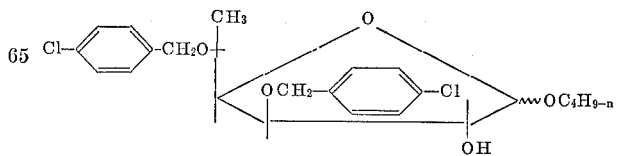

as a slightly yellowish oil; $[\alpha]_D^{20}=-88°\pm1°$ (c.=1 in chloroform).

EXAMPLE 4

A solution of 10 g. of 1,2-O-isopropylidene-3-O-benzyl-5-O-(4-chlorobenzyl) - 6 - desoxy-β-L-idofuranose in 233 ml. of absolute ethanol is mixed at 10° with 67 ml. of a 4.5 N solution of hydrogen chloride in ethanol. The reaction mixture is kept for 16 hours at room temperature, then cooled to 0–5° and neutralized with an aqueous 10 N sodium hydroxide solution. The bulk of ethanol is distilled off at 40° under reduced pressure and the residue is extracted with chloroform. The chloroform solution is washed with aqueous sodium bisulphite solution and with water, dried over sodium sulphate and evaporated under reduced pressure. The residue is freed from residual solvent at 30° under a high vacuum and yields the ethyl - 3 - O - benzyl-5-O-(4-chlorobenzyl)-6-desoxy-L-idofuranoside of the formula:

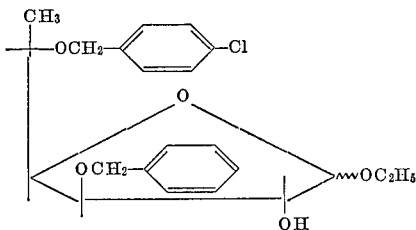

as a slightly yellowish oil boiling at 220°/0.02 mm. Hg; $[\alpha]_D^{20} = -1° \pm 1°$ (c.=1.119 in chloroform).

The starting material may be prepared as follows:

A solution of 11 g. of 1,2-O-isopropylidene-3-O-benzyl-6-desoxy-β-L-idofuranose in 70 ml. of absolute dioxan is mixed with 11.5 of powdered potassium hydroxide. The mixture is heated to 70°, and within 30 minutes a solution of 30 g. of 4-chlorobenzyl chloride in 30 ml. of absolute dioxan is added dropwise. The mixture is allowed to react for 4 hours at 80°, the excess of 4-chlorobenzyl chloride is distilled off with steam, and the whole is cooled and extracted with chloroform. The chloroform solution is washed with water, dried over sodium sulphate and evaporated under reduced pressure. The residue is crystallized from petroleum ether (boiling range 50–70°), to yield the 1,2 - O-isopropylidene - 3-O-benzyl - 5-O-(4-chlorobenzyl) - 6-desoxy-β-L-idofuranose as white crystals, M.P. 70–71°; $[\alpha]_D^{20} = -53° \pm 1°$ (c.=1.122 in chloroform).

EXAMPLE 5

A solution of 9 g. of 1,2-O-isopropylidene-3,5-di-O-benzyl-6-desoxy-β-L-idofuranose in 300 ml. of a 1 N ethanolic hydrogen chloride solution is kept for 16 hours at room temperature, then cooled to 0–5° and neutralized with a 10 N aqueous sodium hydroxide solution. The excess ethanol is distilled off at 40° under reduced pressure and the residue is extracted with chloroform. The chloroform solution is washed with aqueous sodium bisulphite solution and with water and dried over sodium sulphate. To remove the residual solvent, the residue is degassed at room temperature under a high vacuum to yield the ethyl-3,5-di-O-benzyl-6-desoxy - L - idofuranoside of the formula:

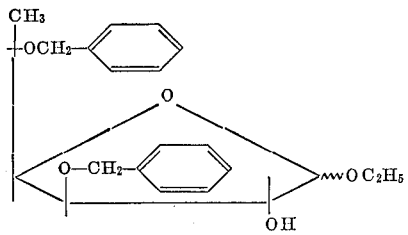

as a slightly yellowish oil; $[\alpha]_D^{20} = -14° \pm 1°$ (c.=1.044 in chloroform).

The starting material may be prepared as follows:

A solution of 9 g. of 1,2-O-isopropylidene-3-O-benzyl-6-desoxy-β-L-idofuranose in 100 ml. of absolute dioxan is mixed with 9 g. of powdered potassium hydroxide, heated to 70° with stirring, then 18 ml. of benzyl chloride are added dropwise within 30 minutes. The mixture is stirred for 3 hours at 80°, the excess of benzyl chloride is distilled off with steam and the residue is extracted after cooling with chloroform. The chloroform extract is washed with water, dried over sodium sulphate and evaporated under reduced pressure. Distillation of the residue under a high vacuum furnishes the 1,2-O-isopropylidene-3,5-di-O-benzyl-6-desoxy-β-L-idofuranose as a colourless oil, B.P. 155–160°/0.01 mm. Hg; $[\alpha]_D^{20} = -57° \pm 1°$ (c.=1.212 in chloroform); which crystallizes on standing, M.P. 67–68°.

EXAMPLE 6

Within one hour, a solution of 27.1 g. of ethyl-3,5-di-O-benzyl-6-O-(4 - methylbenzylsulphonyl) - D - glucofuranoside in 200 ml. of absolute dioxan is mixed at 0–5° with 9.5 g. of lithium aluminium hydride in 4 portions and allowed to react for 15 hours at room temperature, then cooled to 0–5°. A total of 100 ml. of ethyl acetate is added dropwise; the mixture is stirred for 2 hours and 36 ml. of water are then added dropwise. The mixture is filtered; the filter residue is boiled with 50 ml. of dioxan and filtered. The combined filtrates are evaporated under reduced pressure; the residue is distilled and yields the ethyl-3,5-di-O-benzyl-6-desoxy - D - glucofuranoside as a slightly yellowish oil boiling at 200°/0.2 mm. Hg;

$[\alpha]_D^{20} = -48 \pm 1°$ (c.=1 in chloroform)

The starting material used may be prepared as follows:

A solution of 30 g. of 1,2-O-isopropylidene-3-O-benzyl-6-O-trityl-α-D-glucofuranose in 150 ml. of absolute dioxan is mixed with 17 g. of powdered potassium hydroxide, then heated to 70–80°. A solution of 33 g. of benzyl chloride in 50 ml. of absolute dioxan is added dropwise within one hour and the mixture is stirred for 3 hours. Then another 17 g. each of powdered potassium hydroxide and 33 g. each of benzyl chloride are added twice at intervals of 3 hours. After a further 3 hours the excess of benzyl chloride is distilled off with steam, the mixture cooled and extracted with chloroform. The organic solution is washed with water, dried over sodium sulphate and evaporated under reduced pressure, to yield the 1,2-O-isopropylidene - 3,5-di-O-benzyl - 6 - O - trityl-α-D-glucofuranose as a dark brown oil, Rf=0.73 [thin-layer plates RF 254, Merck, Darmstadt; solvent system: 85:15 mixture of chloroform and ethyl acetate].

To a solution of 10 g. of 1,2-O-isopropylidene - 3,5-di-O-benzyl - 6-O-trityl - α - D - glucofuranose in 100 ml. of acetic acid are added dropwise at room temperature 21 ml. of 1 N aqueous hydrochloric acid. After cooling to 0–5°, the resulting precipitate is filtered off, and the filtrate is treated with 200 ml. of water. The mixture is extracted with ether, the ether solution is washed with a staturated aqueous sodium carbonate solution and with water, dried with sodium sulphate and the product is filtered through a column (4.5 cm. diameter, 30 cm. high) of an aluminium oxide (neutral), trityl alcohol first being eluted with ether. After elution with methanol and evaporation of the eluate, the pure 1,2-O-isopropylidene - 3,5 - di - O - benzyl-α-D-glucofuranose is obtained as a slightly yellowish oil boiling at 220°/0.01 mm. Hg; $[\alpha]_D^{20} = -53° \pm 1°$ (c.=1.057 in chloroform).

A solution of 14.7 g. of 1,2-O-isopropylidene-3,5-di-O-benzyl-α-D-glucofuranose in 300 ml. of 1 N ethanolic hydrogen chloride is kept for 16 hours at room temperature, then neutralized at 0–5° with a 10 N aqueous sodium hydroxide solution, the bulk of ethanol is distilled off under reduced pressure and the mixture is extracted with chloroform. The organic extracts are washed with aqueous sodium bisulphite solution and with water, dried over sodium sulphate and evaporated under reduced pressure. The residue is freed from residual solvent under a high vacuum and yields the ethyl-3,5-di-O-benzyl-D-glucofuranoside as a yellow oil boiling at 220°/0.01 mm.

Hg (microdistillation); $[\alpha]_D^{20} = -59° \pm 1°$ (c.=1.057 in chloroform).

A solution of 39.5 g. of ethyl-3,5-di-O-benzyl-D-glucofuranoside in 250 ml. of pyridine is mixed at 5° under anhydrous conditions within 15 minutes with a solution of 19 g. of p-toluenesulphonyl chloride in 100 ml. of dry chloroform and kept for 16 hours at room temperature. The reaction mixture is evaporated at 40° under reduced pressure and the residue is taken up in chloroform and washed with a 10% aqueous copper sulphate solution, water, 2 N aqueous acetic acid and again with water, dried over sodium sulphate and evaporated under reduced pressure. The residue is freed from residual solvent at 30° under a high vacuum and yields the ethyl-3,5-di-O-benzyl-6-O-(4-methylphenylsulphonyl)-D-glucofuranoside as a yellowish oil which is further processed without further purification.

EXAMPLE 7

Capsules containing 0.2 g. of the active ingredient are prepared as follows (for 10,000 capsules):

Ingredients: G.
Ethyl - 3,5 - di-O-(4-chlorobenzyl)-6-desoxy-D - glucofuranoside _____ 2000
Absolute ethanol _____ 200

The ethyl - 3,5 - di-O-(4-chlorobenzyl)-6-desoxy-D-glucofuranoside is mixed with ethanol and the mixture filled on a suitable encapsulating machine into soft gelatin capsules.

Instead of the ethyl - 3,5 - di-O-(4-chlorobenzyl)-6-desoxy-D-glucofuranoside, there may be used in the above procedure, for example, the ethyl - 3,5-di-O-benzyl-6-desoxy-L-idofuranoside.

What is claimed is:

1. A member selected from the group consisting of a 6-desoxy-D-xylohexafuranoside of the formula:

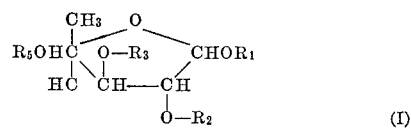

in which $R_1$ is a member selected from the group consisting of lower alkyl, hydroxy-lower alkyl, lower alkoxy-lower alkyl, lower alkanoyloxy-lower alkyl, halogeno-lower-alkyl, lower alkenyl, cycloalkyl, cycloalkenyl, cycloalkyl-lower alkyl, cycloalkenyl-lower alkyl, cycloalkyl in each instance having 3 to 8 ring carbon atoms and cycloalkenyl in each instance having 5 to 8 carbon atoms, phenyl-lower alkyl, phenyl-lower alkenyl and said phenyl-lower alkyl or phenyl-lower alkenyl substituted by a member selected from the group consisting of lower alkyl, lower alkoxy, lower alkenyloxy, trifluoromethyl and halogeno, $R_2$ is a member selected from the group consisting of hydrogen and the acyl residue of a lower alkanedicarboxylic or lower alkenedicarboxylic acid, one of the groups $R_3$ and $R_5$ is a member selected from the group consisting of hydrogen, lower alkyl, hydroxy-lower alkyl, lower alkoxy-lower alkyl, lower alkanoyloxy-lower alkyl, halogeno-lower alkyl, lower alkenyl, cycloalkyl, cycloalkenyl, cycloalkyl-lower alkyl, cycloalkenyl-lower alkyl, cycloalkyl in each instance having 3 to 8 ring carbon atoms and cycloalkenyl in each instance having 5 to 8 carbon atoms, phenyl-lower alkyl, phenyl-lower alkenyl and said phenyl-lower alkyl or phenyl-lower alkenyl substituted by a member selected from the group consisting of lower alkyl, lower alkoxy, lower alkenyloxy, trifluoromethyl and halogen and the other a member selected from the group consisting of lower alkyl, hydroxy-lower alkyl, lower alkoxy-lower alkyl, lower alkanoyloxy-lower alkyl, halogeno-lower alkyl, lower alkenyl, cycoalkyl, cycloalkenyl, cycloalkyl-lower alkyl, cycloalkenyl-lower alkyl, cycloalkyl in each instance having 3 to 8 ring carbon atoms and cycloalkenyl in each instance having 5 to 8 carbon atoms, phenyl-lower alkyl, phenyl-lower alkenyl and said phenyl-lower alkyl or phenyl-lower alkenyl substituted by a member selected from the group consisting of lower alkyl, lower alkoxy, lower alkenyloxy, trifluoromethyl and halogeno, and non-toxic salts of such compound having salt forming groups.

2. A compound as claimed in claim 1 and being selected from the group consisting of a 6-desoxy-D-glucofuranoside of the formula:

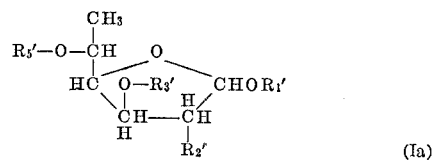

and a 6-desoxy-L-idofuranoside of the formula:

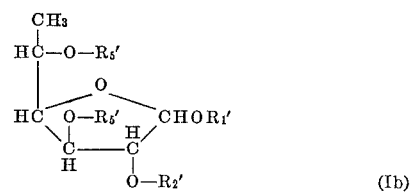

in which $R_1'$ is a member selected from the group consisting of lower alkyl, lower alkenyl and hydroxy-lower alkyl, $R_2'$ is a member selected from the group consisting of hydrogen and the acyl residue of a lower alkanedicarboxylic acid, one of the groups $R_3'$ and $R_5'$ is a member selected from the group consisting of hydrogen, lower alkyl, lower alkenyl, benzyl, benzyl substituted by lower alkyl and benzyl substituted by halogeno, and the other is a member selected from the group consisting of lower alkyl, lower alkenyl, benzyl, benzyl substituted by lower alkyl and benzyl substituted by halogeno, and non-toxic salts of such compounds in which $R_2'$ is the acyl residue of a lower alkanedicarboxylic acid.

3. A compound as claimed in claim 1 and having one of the Formulae Ia and Ib, wherein $R_1'$ is lower alkyl, $R_2'$ is a member selected from the group consisting of hydrogen and the succinyl residue, one of the groups $R^{3'}$ and $R_5'$ is a member selected from the group consisting of hydrogen, lower alkyl, allyl, benzyl, benzyl substituted by lower alkyl and benzyl substituted by halogeno, and the other is a member selected from the group consisting of lower alkyl, allyl, benzyl, benzyl substituted by lower alkyl and benzyl substituted by halogeno, and non-toxic salts of compounds, in which $R_2'$ is the succinyl residue.

4. A compound as claimed in claim 1 and having one of the Formulae Ia and Ib, in which $R_1'$ is lower alkyl, $R_2'$ is a member selected from the group consisting of hydrogen and the succinyl residue and each of $R_3'$ and $R_5'$ is a member selected from the group consisting of lower alkyl, benzyl, benzyl substituted by halogeno and benzyl substituted by lower alkyl.

5. A compound as claimed in claim 1 and having one of the Formulae Ia and Ib, in which $R_1'$ is lower alkyl, $R_2'$ is a member selected from the group consisting of hydrogen and the succinyl residue and $R_3'$ is a member selected from the group consisting of lower alkyl, benzyl, benzyl substituted by halogeno and benzyl substituted by lower alkyl and $R_5'$ is a member selected from the group consisting of benzyl, benzyl substituted by halogeno and benzyl substituted by lower alkyl.

6. A 6-desoxy-D-glucofuranoside as claimed in claim 1 and having the Formula Ia, wherein $R_1'$ is ethyl, $R_2'$ is hydrogen and each of $R_3'$ and $R_5'$ is benzyl.

7. A 6-desoxy-D-glucofuranoside as claimed in claim 1 and having the Formula Ia, wherein $R_1'$ is ethyl, $R_2'$ is hydrogen and each of $R_3'$ and $R_5'$ is 4-chlorobenzyl.

8. A 6-desoxy-D-glucofuranoside as claimed in claim 1 and having the Formula Ia, wherein $R_1'$ is n-butyl, $R_2'$ is hydrogen, and each of $R_3'$ and $R_5'$ is 4-chlorobenzyl.

9. A 6-desoxy-L-idofuranoside as claimed in claim 1 and having the Formula Ib, in which $R_1'$ is ethyl, $R_2'$ is hydrogen and each of $R_3'$ and $R_5'$ is benzyl.

10. A 6-desoxy-L-idofuranoside as claimed in claim 1 and having the Formula Ib, in which $R_1'$ is ethyl, $R_2'$ is hydrogen, $R_3'$ is benzyl and $R_5'$ is 4-chlorobenzyl.

References Cited

UNITED STATES PATENTS

| | | | |
|---|---|---|---|
| 3,157,634 | 11/1964 | Druey et al. | 260—210 |
| 3,196,147 | 7/1965 | Kiss | 260—210 |

LEWIS GOTTS, Primary Examiner

J. R. BROWN, Assistant Examiner

U.S. Cl. X.R.

424—180

CASE 6265/1+2

PO-1050
(5/69)

UNITED STATES PATENT OFFICE
CERTIFICATE OF CORRECTION

Patent No. 3,530,113                    Dated September 22, 1970

Inventor(s) Alberto Rossi

It is certified that error appears in the above-identified patent and that said Letters Patent are hereby corrected as shown below:

Column 1, left-hand portion of formula should read:

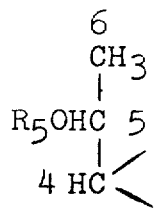

Column 13, left-hand portion of formula should read:

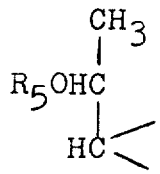

Column 14, lower portion of formula (Ia) should read:

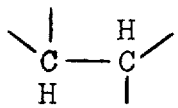

Column 14, line 49, "$R^{3'}$" should be --- $R'_3$ ---.

Signed and sealed this 7th day of September 1971.

(SEAL)
Attest:

EDWARD M. FLETCHER, JR.
Attesting Officer

ROBERT GOTTSCHALK
Acting Commissioner of Patents